US008117254B2

(12) United States Patent  
Nirkhe et al.

(10) Patent No.: US 8,117,254 B2
(45) Date of Patent: Feb. 14, 2012

(54) USER NAME MAPPING IN A HETEROGENEOUS NETWORK

(75) Inventors: Vivek Nirkhe, Redmond, WA (US); Janakiram Ranga Cherala, Redmond, WA (US); Vamshidar Reddy, Redmond, WA (US); Pradeep Suryanarayan, Bangalore (IN); Vikas Tyagi, ShakaPur Delhi (IN)

(73) Assignee: Microsoft Corporation, Redmond, WA (US)

( * ) Notice: Subject to any disclaimer, the term of this patent is extended or adjusted under 35 U.S.C. 154(b) by 3006 days.

(21) Appl. No.: 10/017,469

(22) Filed: Dec. 14, 2001

(65) Prior Publication Data

US 2002/0112045 A1 Aug. 15, 2002

Related U.S. Application Data

(60) Provisional application No. 60/256,024, filed on Dec. 15, 2000.

(51) Int. Cl.
*G06F 15/16* (2006.01)
*G06F 12/00* (2006.01)

(52) U.S. Cl. ............................................. 709/203
(58) Field of Classification Search .............. 709/217, 709/220, 224, 227, 223, 226, 203; 713/201, 713/202; 340/825.31; 707/10, 513; 370/260, 370/261

See application file for complete search history.

(56) References Cited

U.S. PATENT DOCUMENTS

| | | | | |
|---|---|---|---|---|
| 5,604,490 A * | 2/1997 | Blakley et al. | ............. | 726/5 |
| 6,253,204 B1 * | 6/2001 | Glass et al. | ............. | 707/102 |
| 6,357,010 B1 * | 3/2002 | Viets et al. | ............. | 713/201 |
| 6,564,261 B1 * | 5/2003 | Gudjonsson et al. | ......... | 709/227 |
| 6,578,078 B1 * | 6/2003 | Smith et al. | ............. | 709/224 |
| 6,618,858 B1 * | 9/2003 | Gautier | ............. | 725/132 |
| 6,640,307 B2 * | 10/2003 | Viets et al. | ............. | 713/201 |
| 6,754,699 B2 * | 6/2004 | Swildens et al. | ............. | 709/217 |
| 6,826,692 B1 * | 11/2004 | White | ............. | 726/8 |

* cited by examiner

*Primary Examiner* — Zarni Maung
(74) *Attorney, Agent, or Firm* — Lee & Hayes, PLLC

(57) ABSTRACT

A user information management service including features and/or methods for user information mapping.

44 Claims, 5 Drawing Sheets

USER NAME MAPPING IN A HETEROGENEOUS NETWORK

RELATED APPLICATIONS

This application claims priority to an earlier filed U.S. Provisional Patent Application entitled "User Name Mapping", having Ser. No. 60/256,024, a filing date of Dec. 15, 2000, and inventors Vivek Nirkhe, Ram Cherala, Vamshidar Reddy, Pradeep Suryanarayan, and Vikas Tyagi. The thirty-five page specification of this earlier filed application is incorporated by reference herein in its entirety for all purposes.

TECHNICAL FIELD

This invention relates generally to methods and/or devices for managing user access on networks.

BACKGROUND

Computer operating systems (OS), including the WINDOWS® OS (Microsoft Corporation, Redmond, Wash.) and the UNIX® OS (UNIX System Laboratories, Inc., Basking Ridge, N.J.), often use different mechanisms for user identification, authentication, and resource access control. In a heterogeneous network, a network that includes at least two different OS networks, users normally have separate accounts for each OS network, or alternatively, at least one OS network account that differs in some aspect from other OS network accounts. For example, in a heterogeneous network, including WINDOWS® OS and UNIX® OS networks, user information (e.g., identifications and/or names) is typically stored and used differently for each OS network; thus, in general, no association exists for user information between the OS networks. Consequently, a need exists to associate user information between OS networks. In addition, separate name spaces with different user names and different identification mechanisms pose problems for services that provide cross-domain resource access. Thus, a need exists for services that establish a relationship between user identification in different name spaces while allowing users to use a name space in its native OS network.

SUMMARY

A method for mapping a user in a heterogeneous network comprising: receiving on a computer in a first network a user name associated with a user in the first network; mapping the user name to a user name associated with the user in a second network; and mapping the user name associated with the user in the second network to a user identification number associated with the user in the second network. This exemplary method optionally further includes accessing resources on a computer in the second network using the user identification number and/or authenticating the user after the mappings. Further, according to this exemplary method, the computer optionally comprises a gateway and/or a client and/or the mapping includes using a map on a mapping server.

Also disclosed herein is an exemplary computer-readable medium storing computer-executable instructions to map a user name associated with a user in a first network to a user name associated with a user in a second network and to map the user name associated with the user in the second network to a user identification number associated with the user in the second network. This exemplary computer-readable medium optionally includes instructions for a graphical user interface.

Also disclosed herein is another method for mapping a user in a heterogeneous network comprising: receiving on a computer in a first network a user name and a password associated with a user in a second network; authenticating the user using the user name and the password to produce an authenticated user; and mapping the authenticated user to a user identification number associated with the user in a second network. This exemplary method optionally includes accessing resources on a computer in the second network using the user identification number, a computer in the first network performing the authenticating, and/or a computer in the first network performing the mapping. Further according to this exemplary method, the computer comprises a gateway and/or a client and/or the mapping includes using a map on a mapping server.

Also disclosed herein is a computer-readable medium storing computer-executable instructions to map a user name associated with a user in a first network to a user name associated with a user in a second network and to map the user name associated with the user in the second network to a user identification number associated with the user in the second network. This exemplary computer-readable medium optionally includes instructions for a graphical user interface.

Disclosed herein is yet another method for mapping a user in a heterogeneous network comprising: receiving on a computer in a second network a user identification number associated with a user in a first network; mapping the user identification number to a user name associated with the user in a second network. This exemplary method optionally includes accessing resources on a computer in the second network using the user name, a computer in the second network for performing the authenticating, and/or a computer in the second network for performing the mapping. According to this exemplary method, the computer optionally comprises a gateway and/or a server and/or the mapping includes using a map on a mapping server.

Also disclosed herein is a computer-readable medium storing computer-executable instructions to map a user name associated with a user in a first network to a user name associated with a user in a second network and to map the user name associated with the user in the second network to a user identification number associated with the user in the second network. This exemplary computer-readable medium optionally includes instructions for a graphical user interface.

All of the exemplary methods disclosed herein optionally use remote procedure calls. In various methods, the mapping includes using remote procedure calls. For example, the remote procedure calls optionally include at least one remote procedure call selected from the group consisting of getting credentials, authenticating using credentials, checking map status, and dumping maps remote procedure calls.

Additional features and advantages of the invention will be made apparent from the following detailed description of illustrative embodiments, which proceeds with reference to the accompanying figures.

BRIEF DESCRIPTION OF THE DRAWINGS

A more complete understanding of the various methods and arrangements described herein, and equivalents thereof, may be had by reference to the following detailed description when taken in conjunction with the accompanying drawings wherein.

DETAILED DESCRIPTION

Figure 1:
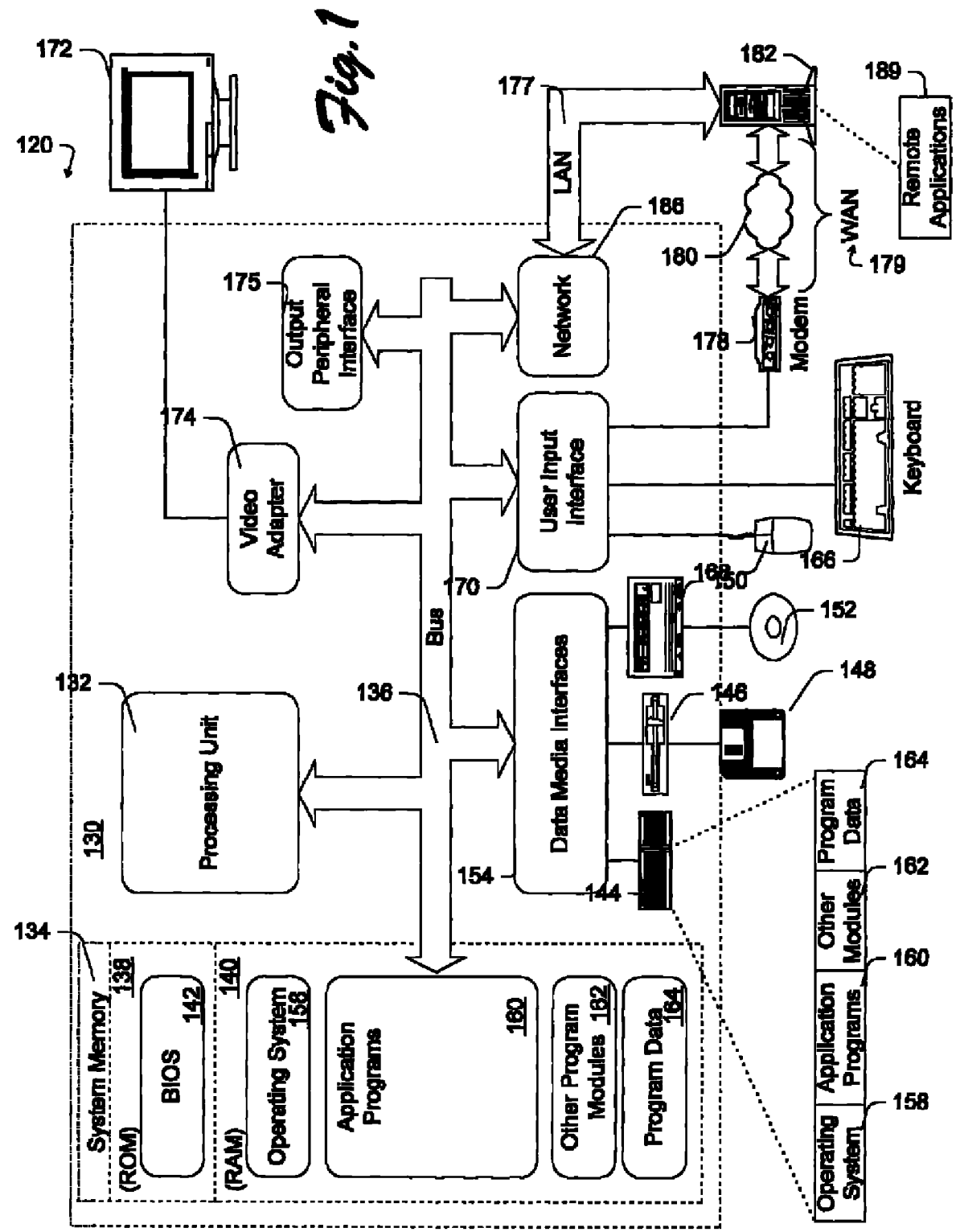
FIG. 1 is a block diagram generally illustrating an exemplary computer system on which the exemplary methods and exemplary systems described herein may be implemented.

Turning to the drawings, wherein like reference numerals refer to like elements, various methods and converters are illustrated as being implemented in a suitable computing environment. Although not required, the methods and converters will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the methods and converters may be practiced with other computer system configurations, including hand-held devices, multi-processor systems, microprocessor based or programmable consumer electronics, network PCs, minicomputers, mainframe computers, and the like. The methods and converters may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described methods and converter arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

User Name Mapping and Related Methods and Devices

An exemplary user name mapping method maps user information in a heterogeneous network, for example, from a first OS network to user information on a second OS network and/or vice versa. As described in more detail below, an exemplary user name mapping method maps WINDOWS® OS network user names to UNIX® OS network user names and/or vice versa. This exemplary method operates as a means to associate user names in two networks for users who have different identities in each network and/or network domain. The exemplary features and/or methods disclosed herein are not limited to networks using a WINDOWS® OS and/or a UNIX® OS, such features and/or methods are also suitable for use with other OSs including, but not limited to, LINUX® OS (Linus Torvalds, Santa Clara, Calif.) and other OSs known to one of ordinary skill in the art. Use of such features and/or methods optionally allows for seamless sharing of data between networks. As described herein, user name mapping is not limited to "names" and generally includes mapping of any user related information. Thus, user name mapping is synonymous with user information mapping.

This disclosure refers to various products, which are known in the art. Such products, developed in part by Sun Microsystems (Palo Alto, Calif.), include NIS computer program, which is a network naming and administration system for networks and sometimes referred to as "YP" (Yellow Pages); NIS+ computer program, which is a latter version of the NIS computer program that provides some additional features (e.g., security); NFS® computer program (Sun Microsystems, Inc., Palo Alto, Calif.), which is a client/server application for networks using the UNIX® OS that lets a user (e.g., NFS® client) view and optionally store and update a file on a remote computer (e.g., NFS® server) as though they were on the user's own computer; and PC-NFS® computer program (Sun Microsystems, Inc., Palo Alto, Calif.), which is a client/server application for networks using the WINDOWS® OS that lets a user (e.g., PC-NFS® client) view and optionally store and update a file on a remote computer (e.g., PC-NFS®B server). Throughout this disclosure, however, a network file system is not limited to the NFS® or the PC-NFS® computer programs and a network information system is not limited to the NIS or NIS+ computer programs.

Other products referred to herein include WINDOWS® Services for UNIX®, which is a product of Microsoft Corporation (Redmond, Wash.) that consists of a number of different components for heterogeneous networks. WINDOWS® Services for UNIX® optionally include components entitled "Server for PCNFS", "Client for NFS", "Server for NFS", and/or "Gateway for NFS". Various exemplary methods and/or devices disclosed herein are suitable for use with and/or as a component of WINDOW® Services for UNIX®.

Various exemplary methods and/or devices include a user information management service that (i) resides on a single node and/or a central mapping server; (ii) obtains UNIX® OS network user names and/or identification numbers from a server using a NIS computer program and/or a NIS+ computer program working in a YP-compatible mode (e.g., a mode capable of handling NIS (YP) type requests as well as NIS+ type requests); (iii) obtains UNIX® OS network user names and/or identification numbers from WINDOWS® Services for UNIX® PC network file system servers and/or other PC network file system servers; (iv) allows for simple and/or advanced mapping; (v) supports multiple WINDOWS® OS and UNIX® OS domains, allows a mapping server to be shared between multiple domains, and/or can map users irrespective of the domains in which the user names were created; (vi) maps users and/or groups to, e.g., allow WINDOWS® OS network file system file servers to provide the same semantics as provided by UNIX® OS network file system servers; (vii) refreshes network information system, network file system (e.g., PC network file system), and/or WINDOWS® OS user names periodically to, e.g., reduce and/or eliminate a need for administrative intervention; (viii) provides command line, graphical, and/or remote administration capability; (ix) supports backup and/or restoration of mappings; (x) allows mapping of multiple WINDOWS® OS users to one UNIX® OS user to, e.g., reduce administrative tasks of creating and/or managing rights and/or permissions; (xi) ensures that only members of an administrator's group can perform administrative tasks; (xii) authenticates a UNIX® OS user name and/or password using a UNIX® OS cryptography algorithm; and/or (xiii) provides UNIX® OS identification wherein a WINDOWS® OS user requires access to UNIX® OS resources using a UNIX® OS account to which the user is not mapped. Accordingly, various features ease administrative tasks such as maintaining maps on WINDOWS® OS computers providing network file system services and/or remote shell service. Details of these and/or other exemplary user information management service features are described below.

User Identification and/or Authentication

The aforementioned UNIX® OS and WINDOWS® OS products have some differences pertaining to identification and/or authentication. In UNIX® OS networks using standard NFS® software, authentication is not used to gain access to network file system resources (note that for secure NFS® software and Kerberos-based NFS® software authentication is explicit). Instead, a network file system file server normally depends upon authentication performed by a client computer. The network file system file server then uses a standard UNIX® OS identification mechanism (e.g., including a UID and/or a GID) to identify a user. A native file system determines access control, which for a UNIX® OS includes use of file-based permission bits. Such bits include read, write, execute, etc. permission bits (e.g., designated r, w, x, respectively). A network file system server normally restricts access to file read and/or write using a list of client computers and permitted access.

In contrast, WINDOWS® OS network users that access remote WINDOWS® OS computer shares are identified by a security identification (SID) rather than by a UID and/or a GID. In such a network, each computer authenticates the user and once the user is authenticated, the user's SID indicates that user's degree of access to network resources. As described below, a user information management service provides for identification of users in a heterogeneous network. For example, an exemplary service provides for identification of WINDOWS® OS users in a UNIX® OS network and for UNIX® OS users in a WINDOWS® OS network.

When a user logs on to a WINDOWS® OS computer, the user is identified with a WINDOWS® OS security identifier (SID). For the user to access UNIX® OS network file system resources, the user needs to acquire UNIX® OS identification information (e.g., a UID and/or a GID). Typically, this requires the user to be authenticated with the UNIX® OS network using either a personal computer network file system server (e.g., a server using PC-NFS® software) or a network information system (e.g., a server using NIS software). In a heterogeneous network, another issue exists in the reverse direction; in other words, when a user logs on to a UNIX® OS computer the user is allocated UNIX® OS user information only (e.g., a UID and/or a GID). Hence, the user needs a way to obtain the SID that identifies that user to WINDOWS® OS computers while accessing files from a WINDOWS® OS computer.

An exemplary user information management service including a user name mapping feature provides for identification of WINDOWS® OS users in a UNIX® OS network and for UNIX® OS users in a WINDOWS® OS network. Such a feature may also authenticate WINDOWS® OS users accessing network file system resources in a UNIX® OS network using UNIX® OS user information (e.g., username and/or password). Thus, an exemplary user name mapping feature optionally maps a WINDOWS® OS user to a corresponding UNIX® OS user and provides a UID and/or a GID by relying on WINDOWS® OS authentication and maps. In a reverse manner, an exemplary feature optionally maps a UNIX® OS UID and/or GID to a WINDOWS® OS user without providing a WINDOWS® OS SID. The WINDOWS® Services for UNIX® component Server for NFS uses an exemplary user name mapping feature that allows for use of a server for UNIX® OS UID and/or GID to WINDOWS® OS user name mapping. This mapping feature obtains a SID for file access optionally through use of a component entitled "Server for NFS Authentication". Various aspects of identification and/or authentication are discussed below.

In a network file system, user information allows for identification. A standard UNIX® OS network file system server uses UNIX® OS network file system identification for access control (note that a remote UNIX® OS network file system server relies on authentication performed by the requesting client computer). In a heterogeneous WINDOWS® OS/UNIX® OS network, WINDOWS® OS network file system servers have to identify requesting users from UNIX® OS network file system requests based solely on UNIX® OS network file system identification, which consists of a user identification (UID) and group identification (GID). However, WINDOWS® OS computers and domains do not use UIDs and/or GIDs for identification. Therefore, an exemplary user information management service maps user information (e.g., UIDs and/or GIDs) contained in the UNIX® OS network file system requests to WINDOWS® OS user information (e.g., user names).

An exemplary user information service allows WINDOWS® OS network file system clients to map the requesting WINDOWS® OS user's user information (e.g., a user name) to UNIX® OS user information (e.g., a UID and/or a GID) before forwarding a UNIX® OS network file system request. Similarly, an exemplary user information service allows a UNIX® OS network file system gateway (computer resident at the interface between networks) to map WINDOWS® OS user information (e.g., user names) to UNIX® OS user information (e.g., UIDs and/or GIDs). In addition, such an exemplary user information service allows mapping of WINDOWS® OS user information to UNIX® OS user information while forwarding file system requests to UNIX® OS network file system servers.

Another exemplary user information service feature provides for transparent access. With transparent access, e.g., user identification and/or authorization, once a user logs onto a computer in a heterogeneous network, the user can access all resources within the user's permissions regardless of the user computer's OS and the resource computer's OS. Accordingly, an exemplary user information service including transparent access requires users to authenticate themselves only once (e.g., a single logon) for local and/or remote resource access. For example, such a feature allows WINDOWS® OS users access to UNIX® OS network file system resources with a single sign on (logon). Users on a heterogeneous network using an exemplary user information service including this feature do not have to remember two sets of user names and passwords, or sign on separately to the two (or more) operating systems.

An exemplary transparent access feature optionally allows a UNIX® OS user to authenticate using UNIX® OS user information (e.g., user name and/or password) and/or a WINDOWS® OS user to authenticate using WINDOWS® OS user information (e.g., user domain credentials) to gain access to UNIX® OS and/or WINDOWS® OS resources. This feature eliminates the need to ask WINDOWS® OS network file system client users to provide user information for authentication to a UNIX® OS network file system network prior to accessing UNIX® OS network file system network resources.

Synchronization or Consistency

Yet another exemplary user information service feature synchronizes maps and/or mapping between disparate OSs on a plurality of computers in a heterogeneous network. In particular, synchronization of maps and/or mappings on computers in a domain ensures proper access to files on UNIX® OS network file system servers and/or WINDOWS® OS network file system clients. For example, a synchronization feature ensures that two WINDOWS® OS computers with network file system client software have the same mappings (or suitable mappings), such that the same user requesting UNIX® OS network file system resources from the two WINDOWS® OS computers would results in the same (or suitable) UNIX® OS user information (e.g., UID and/or GID) being included in the UNIX® OS network file system requests. A synchronization feature also ensures that two WINDOWS® OS network file system servers map the same UNIX® OS user information (e.g., UID and/or GID) for requests to the same WINDOWS® OS user. Such a feature ensures that users will get the same permissions to files when accessed via different network file system gateways. This particular feature can ensure that two UNIX® OS computers with NFS® clients would result in identical access to files on a WINDOWS® network file system for the selected user.

An exemplary synchronization feature allows for sharing of a single set of user name mappings across a heterogeneous network. Thus, multiple instances of network file system clients, servers and gateways can use just one set of mappings.

Central User Information Management Services

Other WINDOWS® OS network file system servers and/or network file system gateways typically require local mappings to map WINDOWS® OS users to UNIX® OS users and vice versa. On the other hand, WINDOWS® OS network file system clients require users to authenticate with network information system and/or personal computer network file system servers.

An exemplary user name mapping feature is optionally deployed on a central server. Such a central feature optionally operates in conjunction with any WINDOWS® Services for UNIX® network file system component. A central server having a user name mapping feature also allows for implementation of central policies wherein users are optionally mapped centrally to reflect network and/or enterprise policies. For example, if a WINDOWS® OS user has read-only access to some files, a central policy causes the mapping feature to map that user to a UNIX® OS user with read-only permissions on those same files. In addition, access from any network file system client optionally results in that WINDOWS® OS user being identified as the mapped UNIX® OS user. According to various exemplary methods, an original policy is optionally preserved, i.e., if a user had read-only access on one OS system, then that user would have read-only access on the other OS system. However, various exemplary methods may also create and/or implement alternative and/or additional policies.

Implementation of a single, central mapping server, e.g., common to an enterprise, can reduce administrative costs associated with mappings. Traditional setup of user name mapping per network file system server and/or network file system gateway normally requires effort to create and manage mappings, which are typically replicated on each server and/or gateway in a network. While not a requirement, implementation of user name mapping on a single, central server (or a limited number of servers) presents significant advantages over traditional mapping practices.

Architecture of an Exemplary User Name Mapping Feature

An exemplary user information management service includes a user name mapping feature that creates mappings between user information in a heterogeneous network. In an example described below, a heterogeneous network includes WINDOWS® OS computers and UNIX® OS computers and WINDOWS® OS user information and UNIX® OS UNIX user information. Mappings for WINDOWS® OS user information and UNIX® OS UNIX user information are maintained, for example, in a table such as that shown in Table 1.

TABLE 1

User name mappings for WINDOWS ® OS and UNIX ® OS users.

| WINDOWS ® user name | WINDOWS ® domain | UNIX ® user name | UNIX ® domain | UID/GID |
|---|---|---|---|---|
| JohnDoe | Indwindows | Johnd | Indunix | 1090/201 |
| Maryjane | Indwindows | Maryj | Indunix | 1223/201 |

As shown in Table 1, each row includes WINDOWS® OS user information and UNIX® OS UNIX user information. For example, according to the mapping in Table 1, WINDOWS® OS user having user name JohnDoe in WINDOWS® OS domain Indwindows has a UNIX® OS user name Johnd, UID 1090, and GID 201 in UNIX® domain Induinx. Thus, Table 1 provides a map for WINDOWS® OS user having user name JohnDoe.

Figure 2:
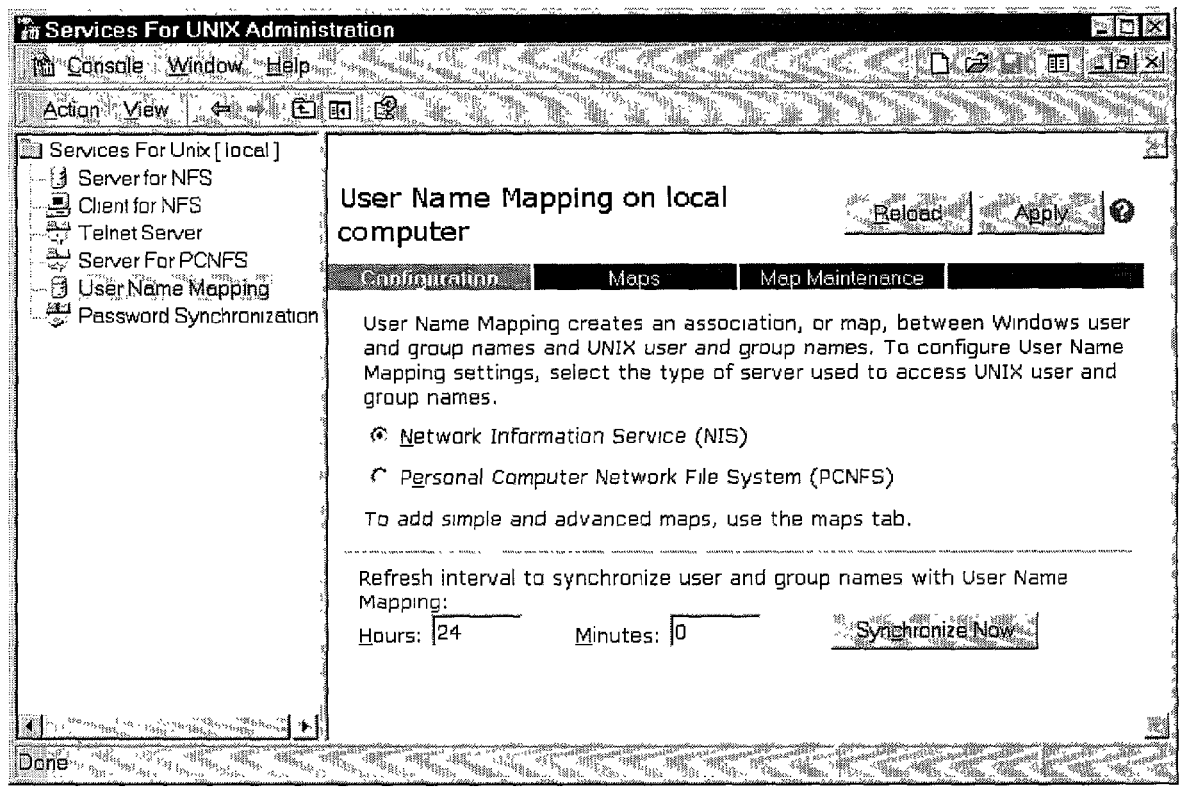
FIG. 2 is a graphical user interface for configuring mapping in a heterogeneous network.

FIG. 2 shows a graphical user interface (GUI) for a user information management service including a user name mapping feature. In a component entitled "Services for UNIX Administration", the GUI shown in FIG. 2 provides user name mapping feature options for configuration, maps, and map maintenance. As shown, the configuration option prompts an administrator to select the type of server used to access UNIX® user information (e.g., user names and group names) from a list of various types of servers, such as, network information service (e.g., NIS, NIS+) and personal computer network file system (e.g., PC-NFS®). An exemplary user name mapping feature allows association of a WINDOWS® OS domain and a UNIX® OS network information system domain and/or a personal computer network file system server.

The GUI shown in FIG. 2 also includes two entry fields (e.g., hours and minutes) for a refresh interval for synchronizing user information along with a button for immediate synchronization. Refreshing can refresh user information associated with, e.g., UNIX®, NIS, PC-NFS®, and/or WINDOWS®, periodically. For example, a user name mapping feature optionally refreshes WINDOWS® OS user information from WINDOWS® OS domain controllers and/or UNIX® OS user information from UNIX® OS network information system servers or personal computer network file system servers in a periodic manner. Such an exemplary feature may add or delete user information automatically whenever a user gets added, deleted from either UNIX® OS or WINDOWS® OS domains. For example, if a user is added to both a WINDOWS® OS domain and a UNIX® OS network information system domain with identical user information (e.g., user names), an exemplary user name mapping feature will create a mapping between the user information automatically. Similarly, if a user is deleted from one of these two domains, such a mapping feature may delete the mapping automatically. Accordingly, automatic addition and/or removal of a user account ensures that network file system access is enabled or disabled automatically.

The GUI of FIG. 2 optionally includes other selections and/or entry fields for computer names, file names (or paths) for files containing user information, and/or other data. Entry of file names and/or paths can support backup and/or restoration of mappings. User name mapping features may save already-created mappings to a file and/or load mappings from a file and/or populate a mapping server. This capability is particularly useful to back up mappings to address failures of a server having user name mapping responsibilities. Overall, GUIs and/or command line utilities can facilitate map creation, maintenance, diagnostics, and/or management on local and/or remote mapping servers.

WINDOWS® Services for UNIX® components that include an exemplary user name mapping feature can be configured to use a specified user name mapping server and, once configured, computers running network file system components obtain mapping service from the specified server. For example, consider WINDOWS® Services for UNIX® having a Client for NFS component wherein a user name mapping feature maps an authenticated WINDOWS® OS network user to a corresponding UNIX® OS network user, and obtains the UID and/or the GID to use in a network file system request to a network file system server (e.g., a server running NFS® software). In yet another example, consider WINDOWS® Services for UNIX® having a Server for NFS component wherein a user name mapping feature maps a UNIX® UID from a network file system request to a corresponding WINDOWS® OS user and determines the access permissions using the mapped WINDOWS® OS users' user information (e.g., identification and/or credentials). Similarly, consider WINDOWS® Services for UNIX® having a Gateway for NFS component wherein a user name mapping feature maps WINDOWS® OS user information (e.g., identification and/or credentials) of each gateway request to a corresponding UNIX® UID and/or GID before forwarding it to a server (e.g., a server running NFS® software).

Through use of a table, such as Table 1, or an equivalent means of mapping, an exemplary user name mapping feature can create maps without making changes to existing user information in either UNIX® OS or WINDOWS® OS domains. A user name mapping feature optionally supports maps for users with identical names in two networks and/or supports maps for users that have different names in two networks. In either instance, mapping can provide consistent and correct file access.

Various exemplary user name mapping features allow for sharing of a single mapping server between multiple domains. For example, in a heterogeneous network, an exemplary user name mapping feature can establish mappings between user information from any NIS domain to user information from any WINDOWS® OS domain and optionally further without regard to the domains in which the user information was created. In the case that a network file system file sharing allows users from different domains to access files, a server implementing an exemplary user name mapping feature may map user information for such users. This particular implementation of user name mapping can benefit roaming users.

An exemplary user name mapping feature includes the capability to map user names as well as group names between the two name spaces. This capability allows, for example, WINDOWS® OS network file system file servers to provide the same semantics as provided by UNIX® OS network file system servers. With group mappings, access to UNIX® OS network file system resources using the group permission bits on a file is honored for WINDOWS® OS users. File access granted to UNIX® OS users for files on a WINDOWS® OS computer are optionally likewise according to group access rights on the files.

An exemplary user information management service having a user name mapping feature allows mapping of multiple users' user information from one network (e.g., WINDOWS® OS network) to a single user's user information from another network (e.g., UNIX® OS network). For example, such a user name mapping feature allows mapping of multiple WINDOWS® OS user names to a single UNIX® OS user name. In a heterogeneous network, such a capability is useful when there is no one-to-one correspondence between users on the disparate networks. Thus, the capability optionally allows WINDOWS® OS users to be mapped to a few UNIX® OS users, which is useful when access to a UNIX® OS file server has to be provided according to different classes of access privileges. Such exemplary user name mapping features can reduce administrative tasks involving creating and managing rights and permissions.

An exemplary user information management system having a user name mapping feature includes security and/or authentication capabilities. For example, one such capability ensures that only members of an administrator group can perform administrative tasks. An authentication capability authenticates, for example, a UNIX® OS user name and password using a UNIX® OS cryptography algorithm and provides UNIX® OS identification. This exemplary system and/or other exemplary systems optionally have authentication capability that uses UNIX® OS user name and password information from network information system and/or personal computer network file system files to authenticate the users, which is useful where a WINDOWS® OS user requires access to UNIX® OS resources using a UNIX® OS account to which the user is mapped. In addition, such features are useful to authenticate a user(s) and/or create a map(s) wherein a map corresponding to the user(s) does not exist.

Figure 3:
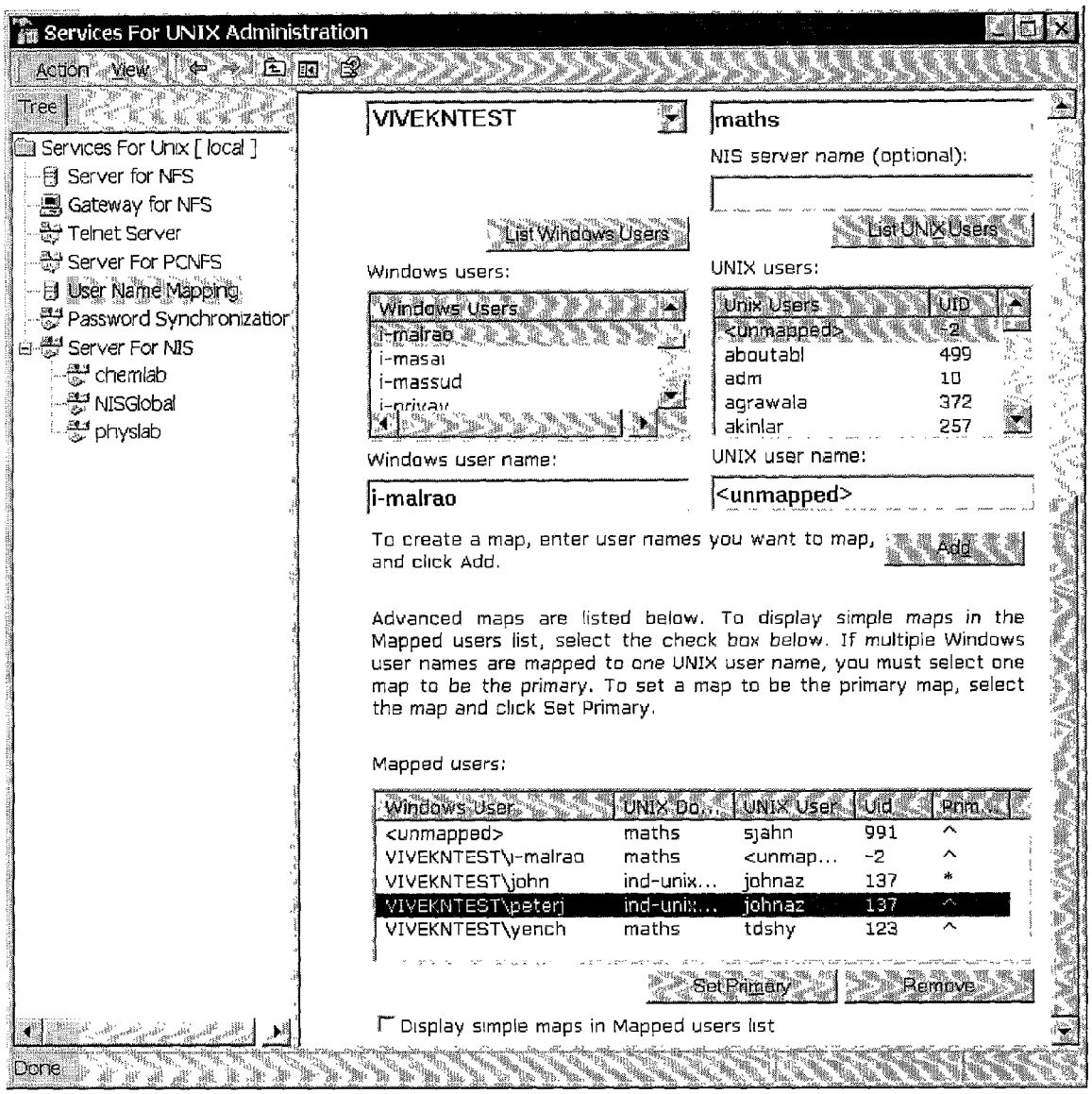
FIG. 3 is a graphical user interface for configuring mapping in a heterogeneous network.

FIG. 3 shows a graphical user interface (GUI) for a user information management service including a user name mapping feature. In a component entitled "Services for UNIX Administration", the GUI shown in FIG. 3 provides user name mapping feature options. As shown in FIG. 3, entry fields are provided for domain and/or server information. For example, as shown, a WINDOWS® OS domain entry field contains the domain name "VIVEKNTEST" and a network information system entry field contains the domain name "maths" while yet another entry field for a network information service server name does not contain a server name. Note that in a NIS system, the server name is optional.

The GUI shown in FIG. 3 also includes control buttons to list users in two networks or a heterogeneous network. Below these control buttons, the GUI displays lists of WINDOWS® OS users and UNIX® OS users and entry fields for at least one WINDOWS® OS user name and at least one UNIX® OS user name. As shown, an entry field for a WINDOWS® OS user name contains the user name "i-malrao" and an entry field for a UNIX® OS user name contains the entry "<unmapped>". Further below, the GUI displays a table similar to Table 1. Additional buttons allow for setting, adding, and/or removing user information and/or maps.

The exemplary user name mapping feature associated with the GUI of FIG. 3 optionally maps users from domains that need access to network file system resources. For example, table entries in the GUI of FIG. 3 indicate mapping of UNIX® OS users from network information system domains named "maths" in addition to a network information system domain named "ind-unix-dev".

Another exemplary user name mapping feature optionally overrides an existing mapping by explicitly associating a WINDOWS® OS user to a user with a different user name in a UNIX® OS name space (and/or vice versa). For example, an entry in the table of the GUI of FIG. 3 explicitly associates a user named "yench" with UNIX® OS user named "tdshy", which optionally overrides a map associating "yench" between WINDOWS® OS and UNIX® OS domains.

Yet another exemplary user name feature maps users that may not have the same user names in networks (e.g., WINDOWS® OS and UNIX® OS networks) within a heterogeneous network. In any network, some users may have different user information (e.g., user names) due to historic and/or administrative reasons. Such user information may be mapped so that any user information associated with a particular user actually refers to that user. Consider a situation wherein a user has two separate user names (e.g., john and johnaz) in WINDOWS® OS and UNIX® OS domains, an exemplary user name mapping feature can map such user names to each other.

Referring again to the GUI of FIG. 3, note that WINDOWS® OS user "i-malrao" is associated with an "<unmapped>" UNIX® OS status. The map of user "i-malrao" to "unmapped" status may indicate that user "i-malrao" should not have access to network file system resources; unless access is through, for example, an anonymous user (e.g., "Uid" (UID) equals "−2", see also below). An exemplary user name mapping feature may map some users to unassigned users thus ensuring no access for such users. For example, note that WINDOWS® OS user "i-malrao" is mapped to "<unmapped>" UNIX® OS status and that UNIX® OS user "sjahn" is mapped to "<unmapped>" WINDOWS® OS status wherein the "unmapped" status optionally corresponds to an unassigned or anonymous user.

Another exemplary user name mapping feature maps multiple WINDOWS® OS users to a single UNIX® OS user. Such a feature is useful when there is a small set of UNIX® OS users that represent a class of access to network file system resources. In the GUI of FIG. 3, this is demonstrated where WINDOWS® OS users "john" and "peterj" are mapped to the same UNIX® OS user "johnaz". One of these users is mapped using a primary mapping, which denotes that for UNIX® OS user "johnaz", mapping to a WINDOWS® OS user should result in "john" and not "peterj".

As already mentioned, in heterogeneous network including a first network and a second network, a mapping server having a user information mapping feature allows for mapping of multiple users associated with the first network to a single user associated with the second network, and/or to receive access privileges according to that of the second network user to whom they are mapped. For example, network file system requests from any of the first network users are sent with user information associated with the single user of the second network (e.g., a UID and/or GID) to whom the users are mapped. This particular method of user information mapping is useful when, for example, there are fewer user accounts in the second network, which may represent different classes of database access, and/or when administrators want to associate a number of users from a first network with such second network users.

For example, in the GUI of FIG. 3, both "john" and "peterj" are associated with UNIX® OS user "johnaz". Network file system requests from a client for a network file system (e.g., Client for NFS) for both "john" and "peterj" will contain UID 137. On the other hand network file system requests with UID 137 to a server for a network file system (e.g., a Server for NFS) will be resolved in the context of "VIVEKNTEST\john" to the primary mapping of "johnaz".

An exemplary user information service feature supports mapping of users to unmapped users, whether it is mapping a user from a first network to an unmapped user from a second network or a user from a second network to an unmapped user from a first network, wherein the first and second network are included in a heterogeneous network. For example, the exemplary feature supports mapping a UNIX® OS user to a WINDOWS® OS unmapped user and/or a Windows® OS user to a UNIX® OS unmapped user.

For a WINDOWS® OS user who is mapped to an unmapped user, an authentication request results in an anonymous UID and/or GID, typically −2 and/or −1, respectively, being used on behalf of the user in a network file system request. Similarly, any file created by such a WINDOWS® OS user on a server for a network information system (e.g., a Server for NIS) is reported as owned by a user with the UID and/or GID of −2 and/or −1, respectively. On the other hand, for a UNIX® OS user who is mapped to a WINDOWS® OS unmapped user, any files created by such a user are marked as owned by a WINDOWS® OS anonymous user. Similarly, network file system requests from a UNIX® OS user who is mapped to a WINDOWS® OS unmapped user will be resolved in the context of the WINDOWS® OS anonymous user. Typically, only files that have privileges for everyone will be accessible to such UNIX® OS user via network file system.

Such an advanced mapping feature is useful to override an inadvertently created mapping, for example, one created due to simple mappings. This feature avoids associating different users who may be given the identical user names in two networks (e.g., WINDOWS® OS and UNIX® OS networks), which would be likely to cause a simple mapping to "incorrectly" map such users. Similarly, mapping a user to an unmapped user is also useful to ensure that some users are provided anonymous network file system access privileges.

An exemplary user information service feature maps group information from a first network to group information of a second network. For example, when mapping a WINDOWS® OS user to a UNIX® OS user, the GID of the mapped UNIX® OS user is provided in a network file system request. This allows appropriate access for the WINDOWS® OS user according to group permission bits on UNIX® OS files. While mapping the UNIX® OS user to a WINDOWS® OS user for a server (e.g., a Server for NFS), the mapping feature maps a GID to a WINDOWS® OS group using a group mapping or mappings. Thus access to the file on a WINDOWS® OS network file system server is determined by the WINDOWS® OS user name and the access control lists (ACLs) for the mapped WINDOWS® OS group.

An exemplary user name mapping feature implemented on a heterogeneous network operates as follows when a client sends a request to resolve a mapping by providing user information associated with the client's network (e.g., WINDOWS® OS or UNIX® OS).

Where a client's client network user information is associated with only one user's user information for another network, the mapping feature returns only that user information. Where a user is associated with several users, one that is marked as primary (if so marked) is returned.

If a client's user information is explicitly associated with an "unmapped" user, the exemplary user name mapping returns an indication that the user is "unmapped". This feature is useful to override users who get mapped by default due and/or to assign an anonymous UID and/or GID.

In the absence of an explicit mapping for a user, the exemplary user name mapping feature optionally searches for and/or identifies a mapping where at least one piece of user information is the same for each network and, if a mapping is found, that mapping is returned. In the case that the exemplary mapping feature fails to identify a mapping for the user, a default status returns, e.g., that the user is unmapped.

An exemplary user information management service method maps a UNIX® OS user's UID and/or GID to a WINDOWS® OS user's user name. Such an exemplary method optionally uses a WINDOWS® OS network network file system server (e.g., a server for NFS) and a mapping server having a user name mapping feature for mapping UNIX® OS user information (e.g., UIDs and/or GIDs) included in network file system requests to WINDOWS® OS user information (e.g., user names). According to this exemplary method, a WINDOWS® OS user name is used to identify file system requests. The WINDOWS® OS network, network file system server then uses a WINDOWS® Services for UNIX® Server for NFS Authentication component (installed locally and/or on a domain controller) for authentication to a WINDOWS® OS to gain file access.

Figure 4:
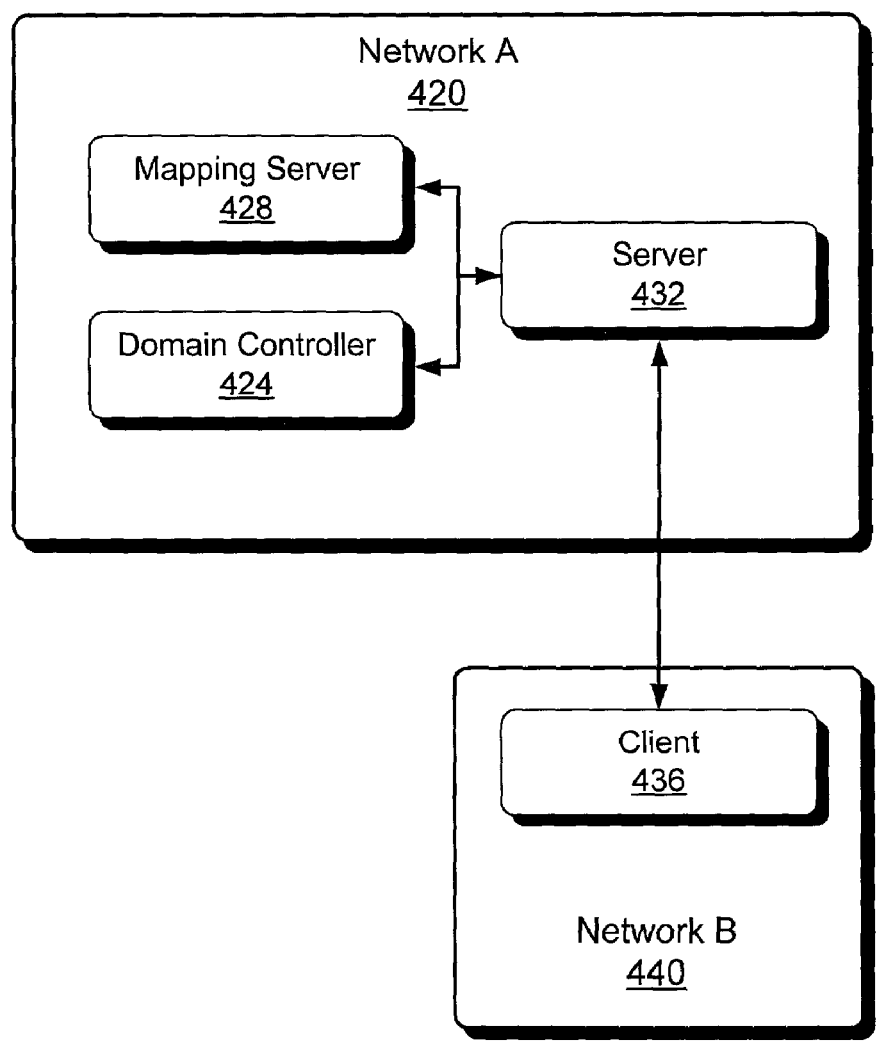
FIG. 4 is a block diagram of a heterogeneous network including two networks and a mapping server.

FIG. 4 illustrates a block diagram of a heterogeneous network 400. The heterogeneous network 400 includes Network A 420 (e.g., a WINDOWS® OS network) and Network B 440 (e.g., a UNIX® OS network). Network A 420 includes a domain controller 424, a mapping server 428 (e.g., server having a user name mapping feature) and a server 432 (e.g., a server for NFS). Network B 440 includes a client 436 (e.g., a network file system client). According to an exemplary method, a server 432 of Network A 420 fulfills a network file system request from a client 436 of Network B 440.

In Network A 420, the server 432 periodically downloads and stores user information maps from the mapping server 428. This particular process is optionally implemented only if a change to user information map has occurred. At some point in time, the server 432 receives a network file system request from a client 436 of Network B 440 that includes user information associated with Network B 440 (e.g., a UID and/or a GID). The server 432 uses a user information map downloaded from the mapping server 428 to map the user information associated with Network B 440 (e.g., a UID and/or a GID) to corresponding user information associated with Network A 420 (e.g., a user name). The server 432 then authenticates a Network A 420 user using the server and the server's authentication component, which typically runs on the domain controller 424 of the particular domain. Alternatively, if the mapped user is local, then the server 432 uses a locally installed authentication component.

Next, the server 432 accesses files by "impersonating" the mapped Network A 420 user and by using credentials of that user and returns file data to the requesting client 436 of Network B 440. The server 432 of Network A 420 optionally downloads an entire set of maps periodically to translate access control lists (ACLs) into Network B 440 user information (e.g., UIDs and/or GIDs) to return to Network B 440 clients (e.g., client 436). This downloading ensures that network file system calls that require returning file attributes (e.g., getFileAttributes) are handled properly.

Yet another exemplary user information service method uses a mapping server having a user information mapping feature. According to this method, a client in a first network allows access to resources using user information from the first network and/or a second network. For example, according to this method, a WINDOWS® OS network, network file system client may allow access to network file system resources using WINDOWS® OS credentials of the user and/or UNIX® OS credentials of the user. Where WINDOWS® OS credentials of the user are used, the credentials are optionally mapped to a UNIX® OS user name and/or to a UNIX® OS UID and/or GID, either directly or indirectly. Where UNIX® OS credentials are used (e.g., a UNIX® OS user name and/or password), the credentials are optionally mapped directly to a UNIX® OS UID and/or GID and/or authenticated and then mapped to a UNIX® OS UID and/or GID.

Figure 5:
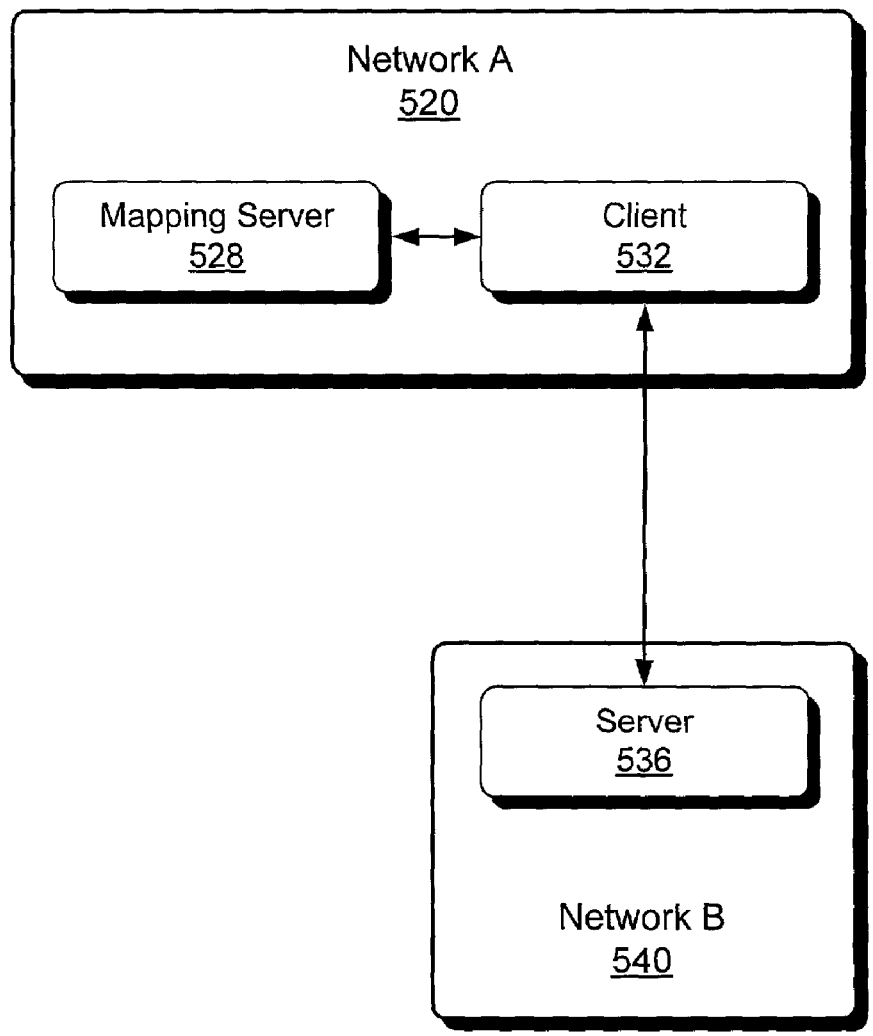
FIG. 5 is a block diagram of a heterogeneous network including two networks and a mapping server.

FIG. 5 illustrates a block diagram of a heterogeneous network 500. The heterogeneous network 500 includes Network A 520 (e.g., a WINDOWS® OS network) and Network B 540 (e.g., a UNIX® OS network). Network A 520 includes a mapping server 528 (e.g., a server having a user name mapping feature) and a client 532 (e.g., a client for NFS). Network B 540 includes a server 536 (e.g., a network file system server). According to an exemplary method, the client 532 in Network A 520 allows access to resources using user information associated with Network A 520 and/or Network B 540.

Referring to FIG. 5, a user requests the client 532 to map a network file system share or access a network file system share. In so doing, the user provides credentials associated with Network A 520. If the request is on behalf of current a Network A 520 user, then the client 532 sends Network A 520 credentials to the mapping server 528, which maps the user's Network A 520 credentials to Network B 540 user information (e.g., a user name) and returns Network B 540 credentials (e.g., a UID and/or a GID). If the request is on behalf of another user, the client 532 also authenticates the user using the usual Network A 520 authentication mechanism and provides the resulting credentials for use in user information mapping. According to this exemplary method, the client 532 stores the returned Network B 540 credentials (e.g., UID and/or GID) and mounts the network file system share.

For subsequent network file system calls for the same network file system share, the client 532 sends the request to the Network B 540 server 536 using the previously returned Network B 540 credentials (e.g., UID and/or GID). The Network B 540 server 536 sends the data for the requesting user having the Network B 540 credentials. This method is suitable for access to network file system resources from a WINDOWS® OS user interface such as a browser (e.g., MICROSOFT® Internet Explorer), via a net command and/or via a mount command.

In the case of access to network file system resources using credentials associated with UNIX® OS, an exemplary method includes a user request to the client 532 to map a network file system share or access a network file system share. In response to such a request, the client 532 sends a UNIX® OS user name and encrypted UNIX® OS password to the mapping server 528. The mapping server 528 uses data from either a personal computer network file system (e.g., PC-NFS®) or a network information system to authenticate the UNIX® OS user name and the password and returns the associated UID/GID to the client 532. The client 532 stores the returned UID/GID and mounts the network file system share. For subsequent network file system calls for the same network file system share, the client 532 sends the network file system request to the server 536 using a previously returned UID and/or GID. Access to network file system resources using UNIX® OS credentials is provided through a mount command. The user mounts the NFS share using a command such as: "mount*\\server\share-u:user-p:passwd" where the user name is a UNIX® OS user name and passwd is the UNIX® OS password.

An exemplary user information service method for gateways includes a user information mapping feature. Interactions between the gateway and user information mapping feature are in some instances similar to the previously discussed interactions between a client for network file system (e.g., a Client for NFS) and a mapping server. For example, where WINDOWS® OS credentials of the user are used, the credentials are optionally mapped to a UNIX® OS user name and/or to a UNIX® OS UID and/or GID, either directly or indirectly.

According to such methods, requests from WINDOWS® 95, WINDOWS® 98, WINDOWS NT®, or WINDOWS® 2000 clients without network file system clients are handled by the gateway (e.g., a Gateway for NFS). For example, a gateway mounts UNIX® OS shares using a root account and exports the mapped drives as WINDOWS® OS shares. The user requests the gateway to access the network file system share mapped by gateway. The WINDOWS® OS request is sent using WINDOWS® OS credentials. The gateway sends WINDOWS® OS credentials to a mapping server, which maps the WINDOWS® OS credentials to the UNIX® OS user name and returns the UID and/or GID. The gateway stores the returned UID/GID by associating the given gateway request with the UID and/or GID. For the subsequent network file system calls for the same network file system share, the gateway sends the network file system request to the network file system server using previously the returned UID and/or GID.

An exemplary user information management service feature allows for root to administrator mapping, and/or vice versa, in a heterogeneous network. For example, an exemplary feature maps a UNIX® OS root user to a domain administrator (or a local administrator). In addition, the feature optionally maps a primary group of the UNIX® OS root to WINDOWS® OS "domain admins" group, for mapping a domain account, or alternatively, an "administrators" group for mapping local accounts.

Various user information management service features discussed herein use remote procedure calls (RPCs). In general, a RPC is a protocol that a program can use to request a service from another program located in another computer in a network without having to understand network details. RPC typically uses a client/server model wherein a requesting program is a client and a service-providing program is a server. Various user information management service features expose their application programming interfaces (APIs) as RPC interfaces which facilitate building of applications. Several exemplary RPCs (GetUnixCredsFromNTUserName, AuthUsingUnixCreds, HasMappingChanged, and DumpAllMaps) supportable by a user information management service are described below.

GetUnixCredsFromNTUserName RPC

This RPC takes a structure containing a WINDOWS NT® OS domainname\username string and returns a corresponding UNIX® OS Domainname\username, UID, number of GIDs and the actual GIDs. Accordingly, this RPC initializes return parameters to 0 or "NULL" (as applicable); looks up the WINDOWS NT® Domainname\username in a user mapping list; if a match is found, it fills up the return parameters with appropriate values; and returns "TRUE".

In the aforementioned RPC, if the WINDOWS NT® Domainname\username is not found in the list then a "NULL" string is returned for UINX® OS username and 0 is returned for UID. In addition, the number of GIDs returned for the user is 0. With this returned information, the caller infers that the requested WINDOWS NT® domanename\usemame was not found by the mapping server.

AuthUsingUnixCreds RPC

This RPC takes a structure containing a WINDOWS NT® OS domainname\username string and returns a corresponding UNIX® OS Domainname\username, UID, number of GIDs and the actual GIDs. Accordingly, this RPC initializes return parameters to 0 or "NULL" (as applicable); looks up the UNIX® OS Domainname\username in a password file present on a system32\etc\password file; if a match is found, it compares the store-encrypted password with one supplied by the caller; if the passwords match, it then looks up a user mapping list and fills up the return parameters with appropriate values; and returns "TRUE".

In the aforementioned RPC, if the UNIX® OS Domainname\username is not found in the list or the supplied password does not match, then a "NULL" string is returned for UNIX® OS username and 0 is returned for UID. The number of GIDs returned for the user is 0. With this returned information, the caller infers that the specified WINDOWS NT® OS domanename\username was not found by the mapping server. In addition, the UNIX® OS domainname\username returned in this RPC may be redundant and optionally ignored by the caller (e.g. a network file system client and/or a gateway).

HasMappingChanged RPC

This RPC takes a structure containing a time stamp. A caller calls a mapping server with the time stamp it received from a prior call, e.g., a last call. If mapping server mappings changed in the period between the present and the prior call, then the mapping server returns a new time stamp. If the mappings have not changed, a set time stamp is returned (e.g., a time stamp of (0, 0), having a low and a high element).

In the aforementioned RPC, if the input time stamp has a high and a low element and is (0, 0), the RPC return the new stamp or else it compares the input time stamp with one stored internally. If the two match, the RPC returns (0, 0) indicating that the mapping has not changed or else it returns a new time stamp. In general, the time stamp generated is a locally generated unique identifier (LUID), which is guaranteed to be unique during the lifetime of the system.

DumpAllMaps RPC

This RPC takes an argument that tells it what type of maps (user/group) to dump. It also optionally takes a cookie that is set to 0 in a current implementation. The argument includes an indication for map types to dump, e.g., 0 is for user maps, 1 is for group maps (note that user and group maps are optionally stored in separate files). A time stamp is also optionally included for dumped maps. According to this RPC, if the principle type is 0, it selects a user list, or else it selects a group list; fills up return parameters with all map information; and returns "TRUE".

In the aforementioned RPC, the caller optionally updates itself with maps dumped by the mapping server. The caller may also store a time stamp received from the mapping server, which may be used by the caller in subsequent HasMappingChanged RPC call.

Various user information management service features discussed herein allow for a command line and/or GUI control (e.g., a Microsoft Management Console (MMC)-based GUI tool). A command line and/or GUI optionally allows for managing a mapping server and/or maps (e.g., mappings). Such interaction tools optionally provide the following functions: start and/or stop a mapping server; create, delete, and/or modify mappings; set a refresh interval to refresh mappings periodically; download UNIX® OS and WINDOWS® OS user information (e.g., user names) from a WINDOWS® OS domain controller and/or a network information system master server and/or update simple mappings; map multiple WINDOWS® OS users to a single UNIX® OS user; set and/or mark a primary mapping; list and/or view user names mappings; and/or restore and/or back up user mappings. In addition, administrative tools allow for local and/or remote administration.

Thus, although some exemplary methods and exemplary systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

The invention claimed is:

1. A method for mapping a user in a heterogeneous network comprising:
receiving on a computer in a first network a user name associated with a user in the first network wherein the first network uses a first operating system;
mapping the user name to a user name associated with the same user in a second network wherein the second network uses a second operating system and wherein the first operating system and the second operating system differ; and
mapping the user name associated with the user in the second network to a user identification number associated with the user in the second network.

2. The method of claim 1 further comprising accessing resources on a computer in the second network using the user identification number.

3. The method of claim 1 further comprising authenticating the user after the mappings.

4. The method of claim 1 wherein the first network uses a personal computer based operating system.

5. The method of claim 1 wherein the second network uses a UNIX based operating system.

6. The method of claim 1 wherein the computer comprises a gateway.

7. The method of claim 1 wherein the computer comprises a client.

8. The method of claim 1 wherein the mappings include using a map on a mapping server.

9. The method of claim 1 wherein the mappings include using remote procedure calls.

10. The method of claim 9 wherein the remote procedure calls comprise at least one remote procedure call selected from the group consisting of getting credentials, authenticating using credentials, checking map status, and dumping maps remote procedure calls.

11. A computer storage device storing computer-executable instructions to map a user name associated with a user in a first network that uses a first operating system to a user name associated with a user in a second network that uses a second operating system, wherein the first operating system and the second operating system differ, and to map the user name associated with the user in the second network to a user identification number associated with the user in the second network.

12. The computer storage device of claim 11 further comprising a graphical user interface.

13. A method for mapping a user in a heterogeneous network comprising:
    receiving on a computer in a first network that uses a first operating system a user name and a password associated with a user in a second network that uses a second operating, system wherein the first operating system and the second operating system differ;
    authenticating the user using the user name and the password to produce an authenticated user; and
    mapping the authenticated user to a user identification number associated with the user in the second network.

14. The method of claim 13 further comprising accessing resources on a computer in the second network using the user identification number.

15. The method of claim 13 wherein a computer in the first network performs the authenticating.

16. The method of claim 13 wherein a computer in the first network performs the mapping.

17. The method of claim 13 wherein the first network uses a personal computer based operating system.

18. The method of claim 13 wherein the second network uses a UNIX based operating system.

19. The method of claim 13 wherein the computer comprises a gateway.

20. The method of claim 13 wherein the computer comprises a client.

21. The method of claim 13 wherein the mapping includes using a map on a mapping server.

22. The method of claim 13 wherein the mapping includes using remote procedure calls.

23. The method of claim 22 wherein the remote procedure calls comprise at least one remote procedure call selected from the group consisting of getting credentials, authenticating using credentials, checking map status, and dumping maps remote procedure calls.

24. A computer storage device storing computer-executable instructions to receive on a computer in a first network a user name and a password associated with a user in a second network, to authenticate the user using the user name and the password to produce an authenticated user and to map the authenticated user to a user identification number associated with the user in a second network wherein the first network uses a first operating system and the second network uses a second operating system and wherein the first operating system and the second operating system differ.

25. The computer storage device of claim 24 further comprising a graphical user interface.

26. A method for mapping a user in a heterogeneous network comprising:
    receiving on a computer in a second network a user identification number associated with a user in a first network; and
    mapping the user identification number to a user name associated with the same user in the second network wherein the user's user identification number optionally maps to more than one user name for the user in the heterogeneous network;
    wherein the first network uses a first operating system and the second network uses a second operating system and wherein the first operating system and the second operating system differ.

27. The method of claim 26 further comprising accessing resources on a computer in the second network using the user name.

28. The method of claim 26 wherein a computer in the second network performs the authenticating.

29. The method of claim 26 wherein a computer in the second network performs the mapping.

30. The method of claim 26 wherein the second network uses a personal computer based operating system.

31. The method of claim 26 wherein the first network uses a UNIX based operating system.

32. The method of claim 26 wherein the computer comprises a gateway.

33. The method of claim 26 wherein the computer comprises a server.

34. The method of claim 26 wherein the mapping includes using a map on a mapping server.

35. The method of claim 26 wherein the mapping includes using remote procedure calls.

36. The method of claim 35 wherein the remote procedure calls comprise at least one remote procedure call selected from the group consisting of getting credentials, authenticating using credentials, checking map status, and dumping maps remote procedure calls.

37. A computer storage device storing computer-executable instructions to receive on a computer in a second network a user identification number associated with a user in a first network and to map the user identification number to a user name associated with the same user in the second network wherein the user's user identification number optionally maps to more than one user name for the user in the heterogeneous network, wherein the first network uses a first operating system and the second network uses a second operating system and wherein the first operating system and the second operating system differ.

38. The computer storage device of claim 37 further comprising a graphical user interface.

39. A method for mapping a user in a heterogeneous network comprising:
- receiving on a computer in a first network a user name associated with a user in the first network;
- mapping the user name to a user name associated with the same user in a second network; and
- mapping the user name associated with the user in the second network to a user identification number associated with the user in the second network, wherein the mapping includes using a map on a mapping server and the mapping server maintains a default map, a simple map and/or explicit maps that provide override;
- wherein the first network uses a first operating system and the second network uses a second operating system and wherein the first operating system and the second operating system differ.

40. The method of claim 39 wherein the mapping server further comprises algorithms for unmapping users, mapping multiple users and/or group mapping.

41. A method for mapping a user in a heterogeneous network comprising:
- receiving on a computer in a first network a user name and a password associated with a user in a second network;
- authenticating the user using the user name and the password to produce an authenticated user; and
- mapping the authenticated user to a user identification number associated with the user in a second network wherein the mapping includes using a map on a mapping server and the mapping server maintains a default map, a simple map and/or explicit maps that provide override;
- wherein the first network uses a first operating system and the second network uses a second operating system and wherein the first operating system and the second operating system differ.

42. The method of claim 41 wherein the mapping server further comprises algorithms for unmapping users, mapping multiple users and/or group mapping.

43. A method for mapping a user in a heterogeneous network comprising:
- receiving on a computer in a second network a user identification number associated with a user in a first network; and
- mapping the user identification number to a user name associated with the same user in the second network wherein the mapping includes using a map on a mapping server and the mapping server maintains a default map, a simple map and/or explicit maps that provide override;
- wherein the first network uses a first operating system and the second network uses a second operating system and wherein the first operating system and the second operating system differ.

44. The method of claim 43 wherein the mapping server further comprises algorithms for unmapping users, mapping multiple users and/or group mapping.

* * * * *